US012579330B1

(12) United States Patent
Wu et al.

(10) Patent No.: US 12,579,330 B1
(45) Date of Patent: Mar. 17, 2026

(54) COMMUNICATION LINK ANALYSIS FOR FALSE-ALARM DETECTION AND SECURITY ENHANCEMENT USING ENHANCED CODES

(71) Applicant: Meta Platforms, Inc., Menlo Park, CA (US)

(72) Inventors: Lingjun Wu, San Jose, CA (US); Yueming Li, San Mateo, CA (US); Han Wang, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 564 days.

(21) Appl. No.: 18/147,194

(22) Filed: Dec. 28, 2022

(51) Int. Cl.
  *G06F 21/86* (2013.01)
  *H03M 13/00* (2006.01)
  *H03M 13/15* (2006.01)

(52) U.S. Cl.
  CPC ............ *G06F 21/86* (2013.01); *H03M 13/15* (2013.01); *H03M 13/611* (2013.01)

(58) Field of Classification Search
  CPC ...... G06F 21/86; G06F 1/20; G06F 2200/201; H03M 13/15; H03M 13/611; H01L 23/473; H01L 23/427; H01L 2023/4062; H01L 23/3672; H01L 21/4882; H01L 23/34; H01L 23/373
  See application file for complete search history.

(56) References Cited

U.S. PATENT DOCUMENTS

| | | | | |
|---|---|---|---|---|
| 6,640,327 | B1 * | 10/2003 | Hallberg ............. | H03M 13/175 |
| | | | | 714/759 |
| 2006/0031671 | A1 * | 2/2006 | Schmit ................... | G08B 25/10 |
| | | | | 713/160 |
| 2012/0158903 | A1 * | 6/2012 | Falk ..................... | H04W 12/106 |
| | | | | 709/217 |
| 2016/0161952 | A1 * | 6/2016 | Buvid ..................... | G01M 3/18 |
| | | | | 700/282 |
| 2019/0114247 | A1 * | 4/2019 | Chen ...................... | H04L 41/142 |
| 2020/0382003 | A1 * | 12/2020 | Sakamoto ........... | H02M 1/0054 |
| 2021/0320673 | A1 * | 10/2021 | Kim .................. | H03M 13/2909 |
| 2024/0060121 | A1 * | 2/2024 | Moffitt ................. | C12Q 1/6841 |
| 2024/0155137 | A1 * | 5/2024 | Wang ................... | H04N 19/159 |

OTHER PUBLICATIONS

"Cyclic Code," Wikipedia, Mar. 3, 2023 [retrieved on Mar. 3, 2023], 5 pages, retrieved from the Internet URL:https://en.wikipedia.org/wiki/Cyclic_code.
"MDS Codes and Singleton Bound," Wikipedia, Mar. 3, 2023 [retrieved on Mar. 3, 2023], 3 pages, retrieved from the Internet URL:https://en.wikipedia.org/wiki/Singleton_bound.

* cited by examiner

*Primary Examiner* — Ali S Abyaneh
(74) *Attorney, Agent, or Firm* — EVERSHEDS SUTHERLAND (US) LLP

(57) ABSTRACT

Systems, apparatuses and methods provide technology that identifies a codeword associated with a fluid cooling system and a network system, generates a status update with the network system, embeds the codeword as a repeating cyclic codeword in a message containing the status update, transmits the message from the network system to the fluid cooling system over a data link, receives the message at the fluid cooling system, and determines, with the fluid cooling system, whether interference is inserted into the message based on the repeating cyclic codeword in the message.

18 Claims, 9 Drawing Sheets

200

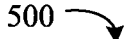
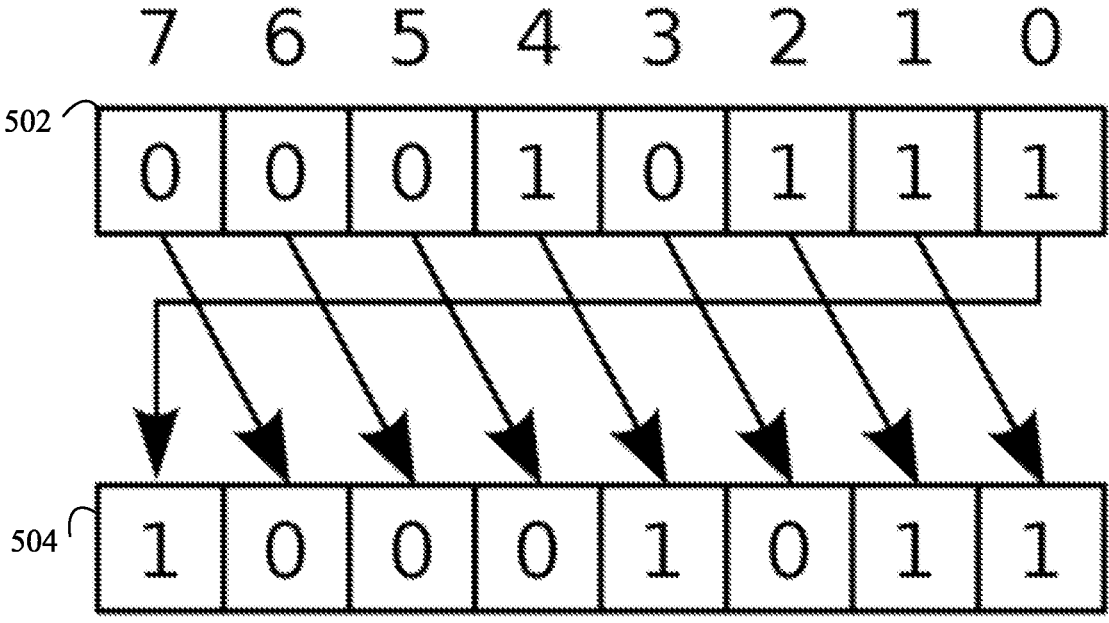
FIG. 5

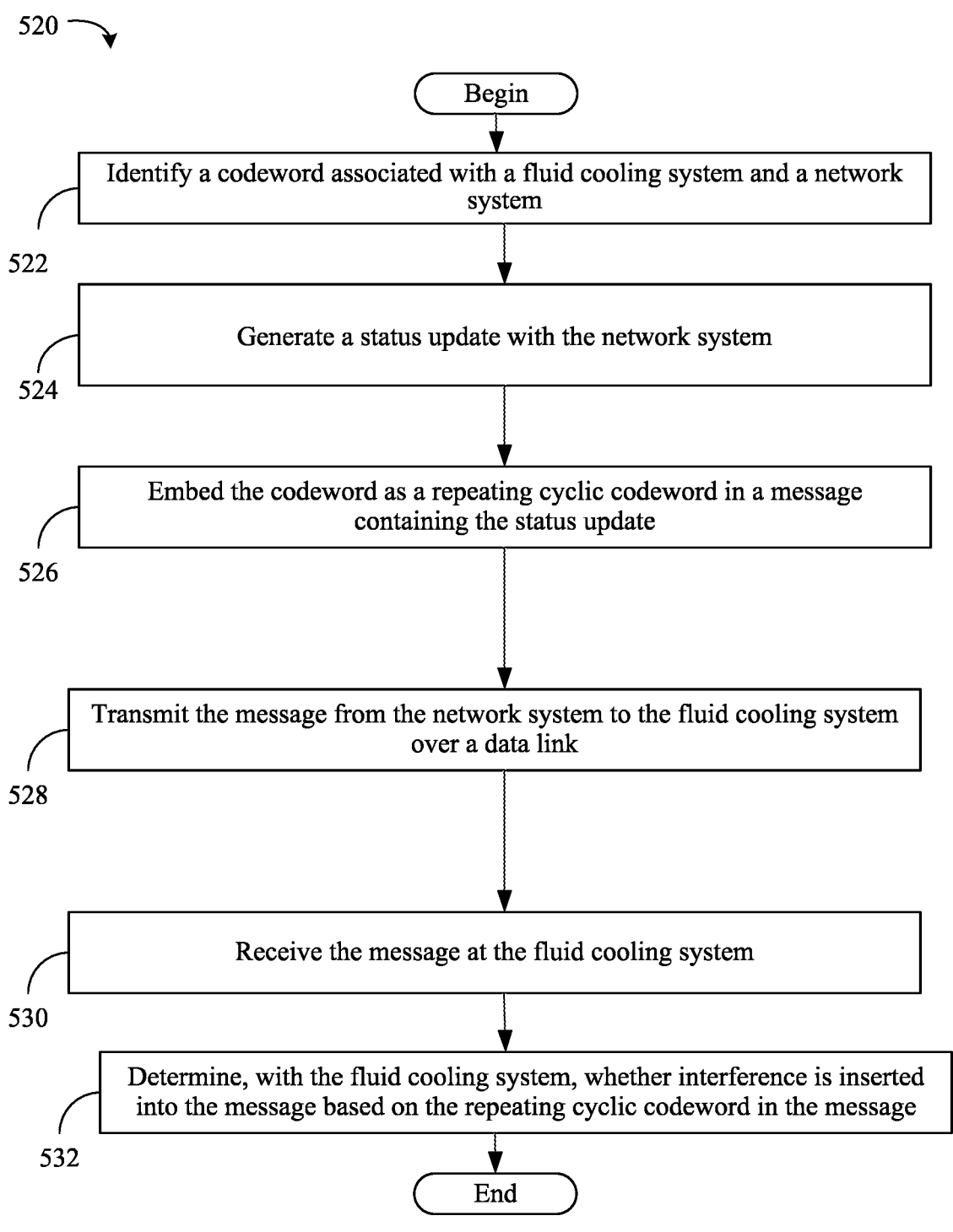

520

Begin

Identify a codeword associated with a fluid cooling system and a network system

522

Generate a status update with the network system

524

Embed the codeword as a repeating cyclic codeword in a message containing the status update

526

Transmit the message from the network system to the fluid cooling system over a data link

528

Receive the message at the fluid cooling system

530

Determine, with the fluid cooling system, whether interference is inserted into the message based on the repeating cyclic codeword in the message

532

End

COMMUNICATION LINK ANALYSIS FOR FALSE-ALARM DETECTION AND SECURITY ENHANCEMENT USING ENHANCED CODES

BACKGROUND

Networked systems may include computing devices that are linked to pool resources. Computing devices on a network may be linked through cables, telephone lines, radio waves, satellites, or infrared light beams. The computing devices may execute various operations, such as machine learning operations, processing operations, application, data storage, communication management, software/firmware and so forth.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes at least one computer readable storage medium comprising a set of instructions, which when executed by a computing device, cause the computing device to identify a codeword associated with a fluid cooling system and a network system, generate a status update with the network system, embed the codeword as a repeating cyclic codeword in a message containing the status update, and transmit the message from the network system to the fluid cooling system over a data link. The instructions when executed by the computing device, cause the computing device to further receive the message at the fluid cooling system, and determine, with the fluid cooling system, whether interference is inserted into the message based on the repeating cyclic codeword in the message. Other examples of this aspect include corresponding computer systems, apparatus, and computer programs recorded on one or more computer storage devices, each configured to perform the actions of the methods.

One general aspect includes a system that includes one or more processors. The system also includes a memory coupled to the one or more processors, the memory may include instructions executable by the one or more processors, the one or more processors being operable when executing the instructions to identify a codeword associated with a fluid cooling system and a network system. The one or more processors are further operable when executing the instructions to generate a status update with the network system. The one or more processors are further operable when executing the instructions to embed the codeword as a repeating cyclic codeword in a message containing the status update, transmit the message from the network system to the fluid cooling system over a data link, receive the message at the fluid cooling system, determine, with the fluid cooling system, whether interference is inserted into the message based on the repeating cyclic codeword in the message. Other examples of this aspect include corresponding computer systems, apparatus, and computer programs recorded on one or more computer storage devices, each configured to perform the actions of the methods.

The method also includes identifying a codeword associated with a fluid cooling system and a network system, generating a status update with the network system, embedding the codeword as a repeating cyclic codeword in a message containing the status update, and transmitting the message from the network system to the fluid cooling system over a data link. The method also includes receiving the message at the fluid cooling system, determining, with the fluid cooling system, whether interference is inserted into the message based on the repeating cyclic codeword in the message. Other examples of this aspect include corresponding computer systems, apparatus, and computer programs recorded on one or more computer storage devices, each configured to perform the actions of the methods.

BRIEF DESCRIPTION OF THE DRAWINGS

The various advantages of the examples will become apparent to one skilled in the art by reading the following specification and appended claims, and by referencing the following drawings, in which:

FIG. 5 is an example of cyclic code shifting according to an example of the disclosure;

FIG. 6 is an example of verifying leaks detection signals in a network system according to an example of the disclosure;

DESCRIPTION EXAMPLE

Figure 1:
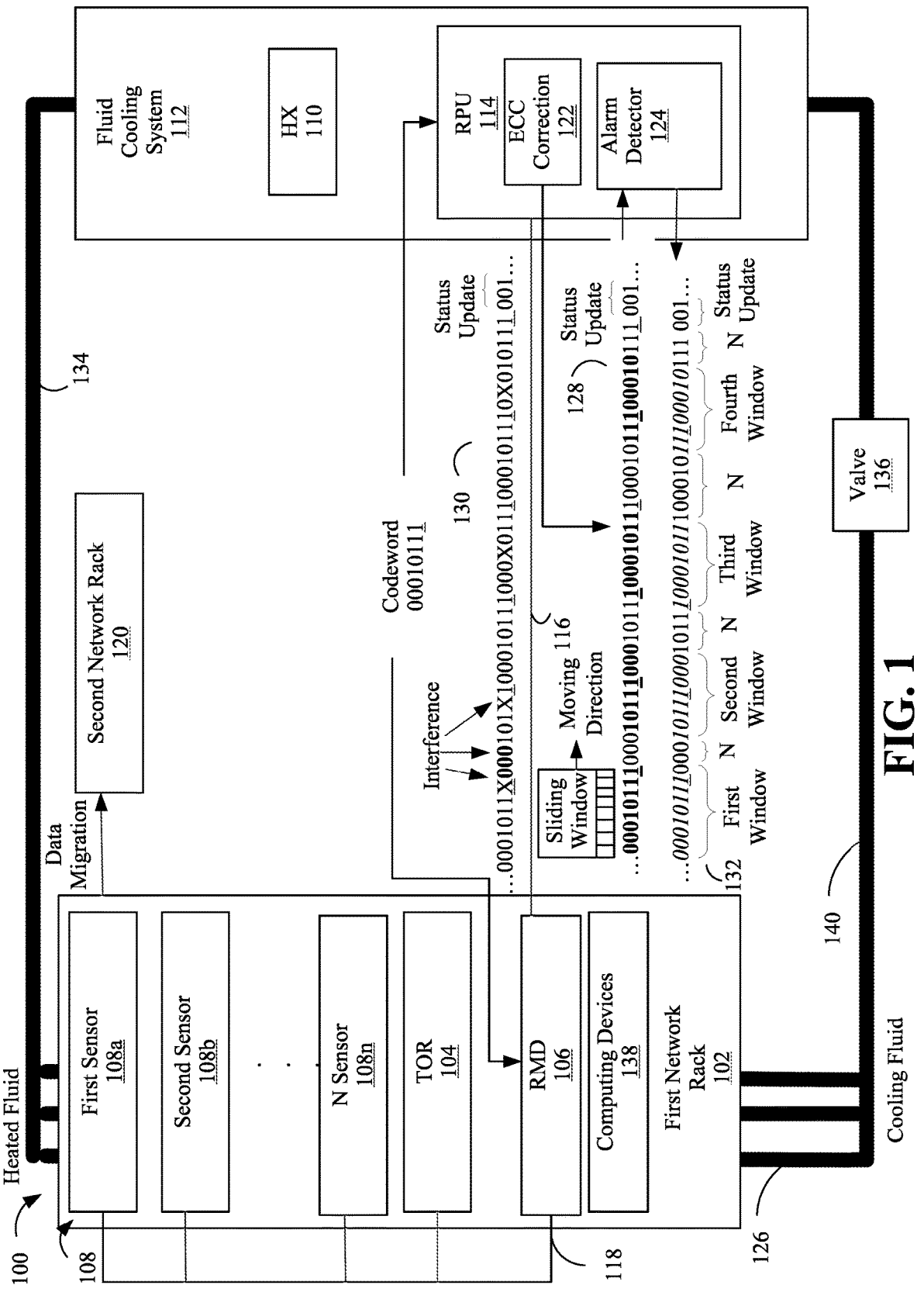
FIG. 1 is an example of a leak detection network architecture according to an example of the disclosure.

Networking equipment, such as servers and other computing devices, generates a significant amount of heat in a relatively small area. Left unchecked, such heat may cause significant issues ranging from throttling to device failure resulting in reduced performance, inefficient power usage and data loss. Thus, computing devices (e.g., servers) in a networked architecture may be cooled to maintain operational temperatures within certain ranges. Such networking equipment(s) may be referred to as a "network system."

One such example of cooling is an "Air-Assisted Liquid Cooling" (AALC) design that leverages general-purpose input/output (GPIO) (e.g., an uncommitted digital signal pin on an integrated circuit or electronic circuit board which may be used as an input and/or output) as the link for communication from a leakage detection sensor to a reservoir and pumping unit (RPU) of a fluid cooling system. The RPU may control cooling liquid flow from the fluid cooling system to a node/rack. A liquid pipeline may carry the cooling liquid from the fluid cooling system to the node/rack to cool the node/rack. The leakage detection sensor may detect liquid leakage in the liquid pipeline that cools the node/rack. When a liquid leakage event occurs in the liquid pipeline, the leakage detection sensor may change a logic of the GPIO by changing the voltage (e.g., from LOW to HIGH or HIGH to LOW) to trigger a leakage detection (LD) alarm to alert the RPU. The RPU may in turn execute actions to shut a valve of the liquid pipeline valve and transmit an instruction and/or warning to a rack manager and/or a node manager to force the node/rack to execute mitigation techniques (e.g., shutdown and migrate data).

Such a design may be vulnerable in certain areas due to a lack of security in existing designs. For example, signals from the liquid leakage detection sensor may be transmitted to the RPU along a communicational link. Interference along the communicational link may occur. Interference may be caused by noise coupling, mis-operation (e.g., physical wiring or equipment is defective), malicious attack (e.g., a malicious attacker physically applies wires to the communication link and sends signals over the wires to the communication link to force logic changes), etc. but is not so limited as to the aforementioned examples. Existing designs may not analyze the signals for interference.

Such interference inserts erroneous values into the signals and may cause false assertions that correspond to false positives of leakage (e.g., a false alarm indicates a leak is present in the node/rack when in reality no leak is present in the node/rack) or false negatives (e.g., indicates a leak is not present in the node/rack when in reality a leak is present in the node/rack). Distinguishing between false positives and false negatives may be difficult to detect and may result in a significant increase in resource overhead.

For example, when an assertion of liquid leakage is detected in the signals (e.g., a false positive), the rack manager and/or node manager may force a shutdown of the node/rack which impacts safety (e.g., may cause power surges), security, efficiency, throughput, and/or DC safety including data safety, power safety and life safety. That is, a sudden power loss caused by a shutdown may damage equipment and corrupt data of the node/rack. This, in turn, leads to more downtime and expensive maintenance, and potentially the complete loss of some systems if the data corruption is irrecoverable.

Conversely, if a false negative is embedded in the signal, the RPU may never identify that a leak is occurring in the node/rack. In such an example, the computing devices in the node/rack may suffer and degrade due to overheating from a failure in cooling liquid circulation. In some cases, the computing devices may fail altogether becoming damaged or destroyed in the process. Thus, false negatives and false positives may have significant impacts but often times go unnoticed in existing systems.

Therefore, examples as described herein include an enhanced communication protocol that detects false positives and false negatives. In detail, the enhanced communication protocol includes a codeword that is embedded into signals between the RPU and leakage detection sensors. Examples as described herein may differentiate between false alarms, malicious behavior and genuine alarms based on an analysis of whether messages follow the communication protocol. Doing so may reduce the occurrence undetected false positives and/or false negatives generating negatively impacting performance as described above.

In detail, examples identify a codeword associated with the fluid cooling system and the network system and generates a status update (e.g., whether a leak of fluid of the fluid cooling system has been detected) with the network system. Examples further embed the codeword as a repeating, cyclic code in a message containing the status update, transmit the message from the network system to the fluid cooling system over a data link, receive the message at the fluid cooling system, and determine, with the fluid cooling system, whether interference is inserted into the message based on whether the repeating cyclic code is retrievable from the message. Doing so may detect whether false positives and/or false negatives are being inserted into the message, and adopting a mitigation strategy to remedy as much. Notably, when false positives and/or false negatives are detected, examples may adopt measures to mitigate the effect false positives and/or false negatives, may avoid executing actions that are undertaken when a false positive is detected, and/or attempt to correct communicational errors when a false negative is detected. While liquid is described herein, it will be understood that examples herein are applicable to fluid cooling systems and/or general-purpose input/output (GPIO) systems (e.g., any system that carries signals with GPIO signals) as well. GPIO may serve as an address input/output, data input/output, a power rail status (e.g., Power GOOD), a circuit reset signal, etc.

Turning now to FIG. 1, a leak detection network architecture 100 is illustrated. The leak detection network architecture 100 may be implemented in a computing device including a memory and processor, computing system (e.g., hardware, configurable logic, fixed-function logic hardware, at least one computer readable storage medium comprising a set of instructions for execution, etc.).

The leak detection network architecture 100 includes a first network rack 102. The first network rack 102 may operate in a data warehouse, cloud environment, etc. The first network rack 102 may include a plurality of computing devices (e.g., servers, laptops, desktops, etc.) that execute various functions related to different operational environments (e.g., cloud-computing backend, data warehouse, etc.).

A fluid cooling system 112 introduces supplies cooling fluid through a supply pipe 140. To reduce negative effects from heat, cooling fluid progresses through cooling pipes 126 to cool the first network rack 102. The fluid cooling system 112 may control the flow of the cooling fluid through the first network rack 102 via the cooling pipes 126. The cooling pipes 126 may stretch throughout the first network rack 102 to cool computing devices 138 (e.g., servers, hardware elements, switches routers, radios, mobile devices, laptops, etc.) of the first network rack 102. The cooling fluid is heated by the computing devices 138, and eventually exits as heated fluid through return line 134. The return line 134 returns to the fluid cooling system 112. A heat exchanger (HX) 110 cools the heated fluid to generate the cooling fluid which is then provided to the first network rack 102. The RPU 114 (e.g., a flow control module) may control the flow of the cooling fluid to the first network rack 102 and monitor for fluid leaks. If a fluid leak is detected, transmission of the cooling fluid to the first network rack 102 may be discontinued by shutting valve 136 to avoid fluid accumulation in the first network rack 102 and potentially damaging the computing devices 138 in the first network rack 102.

The first network rack 102 includes a plurality of sensors 108. The plurality of sensors 108 may measure different processes to monitor for a fluid leak from the cooling pipes 126. The plurality of sensors 108 may include any number of sensors. In this example, the plurality of sensors 108 includes first sensor 108a and second sensor 108b-N sensor 108n. The first network rack 102 may further include top-of-rack (TOR) switches 104.

The plurality of sensors 108 may output signals to a rack management device (RMD) 106 (e.g., to a GPIO pin) over a first communication link 118 indicating whether a leak has been detected. For example, each respective sensor of the plurality of sensors 108 may output a different signal indicating whether the respective sensor sensed a fluid. The RMD 106 may in turn modify a bit value of a signal to the RPU 114 when liquid leak is detected. The bit value indicating a leak is flexible and may be either a "0" or a "1" depending on the configuration of the leak detection network architecture 100. For example, bit values indicating "0" may indicate that no leak is present, while a "1" may indicate that a leak is present.

The RMD 106 may aggregate the signals from the plurality of sensors 108 and generates a message 130 (e.g., a signal) to the RPU 114 reflecting whether a leak was detected by the plurality of sensors 108. The message 130 may be a binary string providing a status update. The status update may indicate whether a leak of fluid of the fluid cooling system 112 has been detected. For example, an active LOW logic may correspond to a leakage detection.

The RMD 106 and RPU 114 receive a codeword, which in this examples is "00010111." The codeword may be generated with an encoder which can execute soft encoding using software or hardware (e.g., application-specific integrated circuit (ASIC)). The codeword may be inserted into the message 130 to detect interference. To do so, the codeword may be repeatedly embedded in a cyclic manner into the message 130. For example, the RMD 106 may repeatedly apply a circular shift to the codeword to generate shifted codewords, and embed the shifted codewords into the message 130. Furthermore, the codeword may be a maximum distance separable (MDS) code. An MDS code may be a linear block code that achieves equality in the Singleton bound. An MDS code may ensure that a length of the codeword is set to avoid unwanted replication of the codeword (e.g., by a malicious actor, noise, etc.) by increasing the length of the codeword. For example, a two bit codeword may easily replicated since only two bits may be manipulated to discover a correct value for the two bit codeword. A longer codeword (e.g., 16 or more bits) may be more difficult to replicate since the probability of manipulating each of the bits of the longer codeword to a correct value is diminished. MDS may ensure that the minimum Hamming distance between an arbitrary two codewords is maximized, which keeps codewords a minimum distance (e.g., far-away) from neighboring codewords.

For example, the RMD 106 may generate the message 130 that is transmitted across second data link 116. The second data link 116 may connect the RMD 106 and the RPU 114. The message 130 is in a binary format and includes both the status update and the shifted codewords. The message 130 may also be in an error-correcting code (ECC) format due to the cyclical nature of the codeword. That is, the shifted codewords may be ECCs. A stream of the shifted codewords may be concatenated in the message 130.

Initially, the RPU 114 determines that several bits appear to have been corrupted symbols by noise/erasures, etc. The "X" in the bitstream of the message 130 represents the corrupted bits. Thus, the RPU 114 applies an ECC correction 122 to correct the corrupted bits which results in a modified bitstream 128. In the modified bitstream 128 the corrupted bits ("X") are replaced with either a "1" or a "0." Thus, bits which are corrupted due to random error (including burst errors) such as noise coupling or power rails may be corrected prior to analyzing whether the codeword(s)

appears. The redundancy of an ECC, such as the message 130, enables the ECC correction 122 to correct such errors.

As noted above, the codeword is "00010111." In this example, the last "one" in the codeword is underlined in the various cyclic codewords. A cyclic code is a block code in which circular shifts of each codeword gives another word that belongs to the code. Cyclical codes are ECCs that have algebraic properties that are convenient for efficient error detection and correction. As such, "00010111," "10001011," "11000101," 11100010." "01110001." "10111000," "01011100," "00101110," are all valid codewords, with the same "1" being underlined in each of the valid codewords. Thus, for any number of consecutive shifts to the codeword, the result is always a valid codeword.

When the RMD 106 keeps sending a codeword back-to-back and concatenated then any moving window (such as sliding window) of the codework size that captures any portion of the modified bitstream 128 will always have a valid codeword unless noise interference occurs. Thus, the repeating, cyclic code avoids coordinating and synchronizing timing for code transmission and detection for the RMD 106 and RPU 114 since a valid codeword is repeatedly sent. Furthermore, identification and replication of the codeword is difficult since the codeword is repeatedly, circularly shifted to avoid consecutively repeating a same sequence of bits representing the codeword.

The alarm detector 124 detects whether the modified bitstream 128 is reliable or is suffering from interference making the message unreliable. In this example, the codewords in the modified bitstream 128 are bolded. Several bits (labeled as noise or "N") are in-between the codewords however. For example "000" is between "00010111" and "10111000" as one example, and 1011 is between "10111000" and "10001011" as a second example.

To address the above insertion of noise, the RPU 114 applies a moving, fixed size time sliding window to detect the codeword(s) with multiple retries to increase flexibility and accuracy while also mitigating random noise. The sliding window may be eight bits (as shown by the 8 boxes) in this example, or has a size that is equal to a size of the codeword (i.e., 8 bits). For example, the windowed bitstream 132 illustrates the codewords in italics with the "1" from the non-shifted codeword (discussed above, "00010111") being underlined. Each codeword of the first-fourth windows is within one location of the sliding window (e.g., illustrated as a bracket). That is, the sliding windows is repeatedly applied to the windowed bitstream 132 to determine whether valid codewords exist in the windowed bitstream 132. In this example, each of the first-fourth windows includes a valid codeword, which may be circularly shifted relative to the non-shifted codeword (i.e., 00010111).

The numbers between the codewords are noise N. Thus, four codewords are identified. If a predetermined number of codewords could not be identified from the windowed bitstream 132, the windowed bitstream 132 may be determined to be compromised and sensor readings (e.g., status updates) contained in the message 130 may be ignored or discarded as being unreliable.

In this example, although noise is detected, a predetermined number of the codewords (e.g., 4) are detected such that the windowed bitstream 132, and correspondingly the message 130, is deemed to be reliable. As such, the windowed bitstream 132 is further analyzed to determine if a leak exists. In this example, a leak is detected to exist from the message 130 and/or windowed bitstream 132, and specifically from the status update of the windowed bitstream 132 and/or message 130. That is, as illustrated, the last bit of the status update is a "1" indicating that a leak is detected.

As a consequence, the RPU 114 issues a control signal to shut a valve 136 to cease communication of fluid to the first network rack 102, and sends an instruction and/or warning to a rack manager or node manager to force the first network rack 102 to shutdown. Prior to shutting down, the first network rack 102 may migrate data to the second network rack 120 to reduce data loss.

For example, the first and/or second data links 118, 116 might be disconnected by mis-operation or faulty link components. The first and/or second data links 118, 116 may be maliciously attacked by purposely forcing the assertion logic by external devices, etc. The consequences of such situations may be severe, including a forced shutdown by false alarm or malicious attack, prevented from shutdown no matter what even when a real leakage occurs and intermittent and/or frequent shutdown randomly without forecast (e.g., devoid of rationales). In some examples, the interference includes one or more of noise coupling, mis-operation, faulty link and/or malicious attack.

Thus, the above approach provides an efficient manner to check whether messages from the RMD 106 are genuine or tampered/unreliable. Doing so may reduce costly mistakes, such as shutting down the first network rack 102 and closing the valve 136 of the cooling pipes 126 which may result in idle resources, data corruption and unnecessary overhead to check the first network rack 102. For example, an operator may receive a message that the first network rack 102 is leaking and physically check the first network rack 102 prior to re-starting the first network rack 102. In the alternative, if the message is tampered with in such a way to remove bits indicating that leak has occurred, the results may be equally, if not more so, detrimental since fluid and/or heat would accumulate in the first network rack 102 several damaging the equipment in the first network rack 102.

Thus, examples herein may check the reliability of the messages with a repeating cyclic code such as the codeword "00010111". The cyclic rotation of the codeword makes detecting the code more difficult since malicious actors may not readily identify a repeating set of numbers with ease, particularly as malicious actors may not even know the size of the codeword.

The physical layer of detecting frequent high to low and low to high conversions may mitigate the link disconnections, mis-operation scenarios such as cable unplug, etc. If a valid codeword is detected, this will ensure this a real leakage is detected and a correct alarm will be triggered. The first and second data links 116, 118 may be GPIO data link layers. As will be explained below, a multilayer security will be embedded with MDS, Cyclic and scrambler (e.g., encoder). That is, in some examples the data may further be encoded with a scramblers, descramblers, encoders and decoders.

As such, examples identify a non-trivial communication pattern as the assertion of leakage detection occurrence. Examples further provide a noise interference proof and include a flexible on assertion signal sampling timing and scheduling. Some examples may further encrypt data such as the message 130. Some examples further include assertion signal pattern programmability and is able to handle burst errors and tampering. Furthermore, examples may seamlessly integrate with most architectures to without significant hardware cost.

Figure 2:
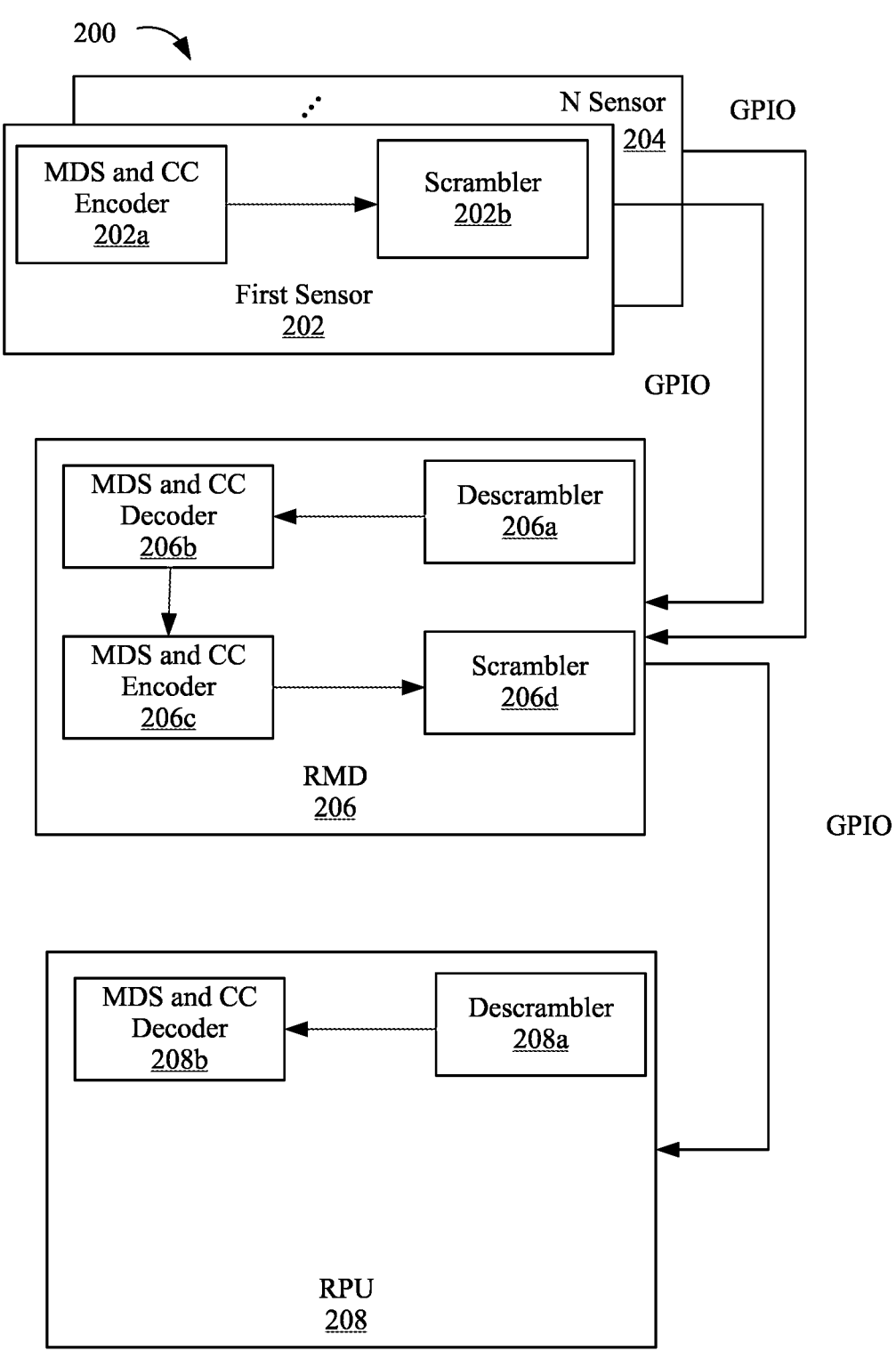
FIG. 2 is a security enhanced leak detection network architecture with enhanced cooling according to an example of the disclosure.

FIG. 2 illustrates a security enhanced leak detection network architecture 200 with enhanced cooling. The security enhanced leak detection network architecture 200 may be a computing architecture and may be readily incorporated in or operated in conjunction with the leak detection network architecture 100 (FIG. 1). For example, the security enhanced leak detection network architecture 200 may be implemented in a computing device including a memory and processor, computing system (e.g., hardware, configurable logic, fixed-function logic hardware, at least one computer readable storage medium comprising a set of instructions for execution, etc.).

In this example, first-N sensors 202, 204, etc. are provided. The first-N sensors 202, 204, etc. may be readily substituted for the plurality of sensors 108 (FIG. 1). The first-N sensors 202, 204, etc. sense for leakage condition. In some examples, the first-N sensors 202, 204 may be leakage detection sensors, environmental sensors, thermal sensors, humid sensors, noise sensors, optical sensors, etc., that are able to sense leaks.

The first sensor 202 includes an MDS and cyclic code (CC) encoder 202a that encodes sensor readings with a cyclic codeword as described above. A scrambler 202b may be a device that manipulates a data stream before transmitting to scramble (e.g., rearrange, randomization, etc.) the data stream. The N sensor 204 and any other sensors may be similarly formed. Thus, the first sensor 202, N sensor 204, etc. may output scrambled and encoded sensor data.

An RMD 206 may receive the scrambled and encoded sensor data. The RMD 206 may be readily substituted for the RMD 106 (FIG. 1). A descrambler 206a receives the scrambled and encoded sensor data and descrambles the scrambled sensor data. The MDS and CC decoder 206b then receives the descrambled sensor data. The MDS and CC decoder 206b may decode the sensor data and combine the sensor data from the various first sensor 202, N sensor 204, etc. together to generate a message. The message may be encoded by the MDS and CC encoder 206c and scrambled with the scrambler 206d to generate an encoded and scrambled message. The encoded and scrambled message is transmitted to the RPU 208.

The RPU 208 may receive the encoded and scrambled message. The RPU 208 may be readily substituted for the RPU 114 (FIG. 1). The RPU 208 may descramble the message and apply the MDS and CC decoder 208b to decode the message. The RPU 208 may verify the codeword(s) in the message as described above to determine whether the message is genuine or tampered, and form a decision accordingly.

In some examples, the candidate codes for selection are Hamming code and Reed-Solomon code but not limited thereto. Customized codes may also be designed and achieved. The MDS and CC encoder 202a, 206c, the MDS and CC decoder 206b, 208b, scrambler 202b, 206d, descrambler 206a, 208a maybe implemented as firmware code in some examples. In some examples MDS and CC encoder 202a, 206c, the MDS and CC decoder 206b, 208b, scrambler 202b, 206d, descrambler 206a, 208a are implemented in hardware to enhance security and offloading if necessary. Thus, the security aspects include includes various scramblers 202b, 206d (e.g., masks), varying code sizes, leveraging larger Galois Fields, generator method and plaintext hiding and security key embedded messages.

The scramblers 202b, 206d may use pseudo-random bits to cover and/or mask an original context to increase security. The code sizes will increase the Hamming distance to prevent the generation of valid codeword by manipulating some portions of bits. Leveraging Galois Fields may be an abstract algebraic way to map the binary bits to a different mathematical field along with a field generator polynomial to further improve the security. The security key process described above allows embedding of encrypted bits on top of the shifted codewords.

Figure 3:
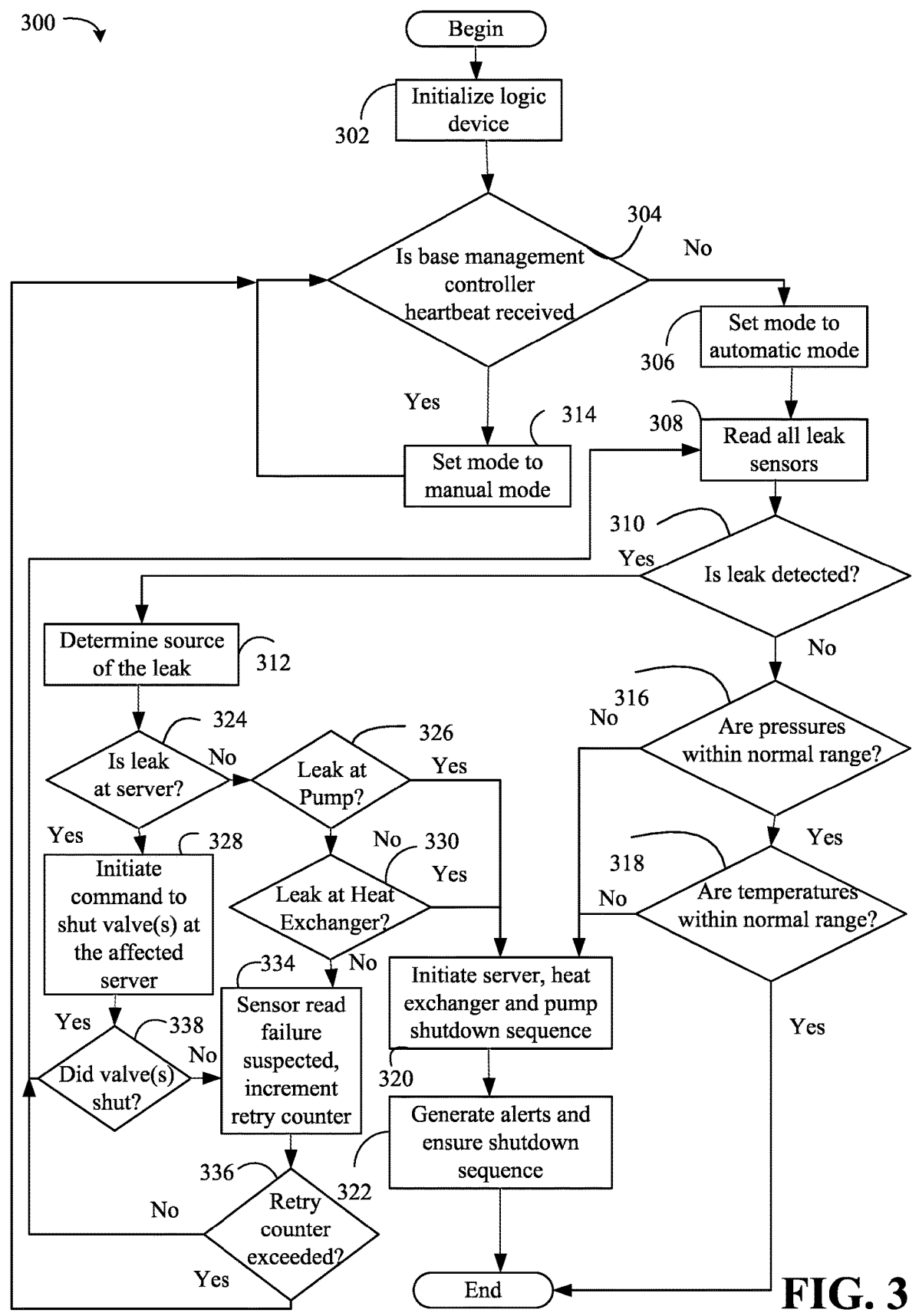
FIG. 3 is a flowchart of an example of a method of identifying, monitoring and mitigating leaks in a network system according to an example of the disclosure.

FIG. 3 illustrates a method 300 to identify, monitor and mitigate leaks in a network system. One or more aspects of method 300 may be implemented as part of and/or in conjunction with the leak detection network architecture 100 (FIG. 1) and/or the security enhanced leak detection network architecture 200 (FIG. 2). Method 300 may be implemented in a computing device, computing system (e.g., hardware, configurable logic, fixed-function logic hardware, at least one computer readable storage medium comprising a set of instructions for execution, etc.).

Illustrated processing block 302 initializes a logic device (e.g., a complex programmable logic device). Illustrated processing block 304 determines if a base management controller (e.g., a controller on an RMD) heartbeat is received. If illustrated processing block 304 does receive the heartbeat, illustrated processing block 314 sets the mode to manual mode. If illustrated processing block 304 does not detect the heartbeat, illustrated processing block 306 sets the mode to an automatic mode. Illustrated processing block 308 reads all leak sensors (e.g., with GPIOs). Illustrated processing block 310 determines if the leak is detected.

If so, illustrated processing block 312 determines the source of the leak. Illustrated processing block 324 determines if the leak is at the server. If so, illustrated processing block 328 initiates a command to shut valve(s) (e.g., within a fluid cooling line) at the affected server. Illustrated processing block 338 determines if the valve(s) shut. If so, illustrated processing block 308 executes again. If processing block 338 detects that the valves did not shut, illustrated processing block 334 determines that a sensor read failure is suspected, and increments a retry counter. Illustrated processing block 336 determines if the retry counter is exceeded. If not, processing block 308 executes. If the retry counter is exceeded, processing block 304 executes.

If processing block 324 determines that the leak is not at the server, illustrated processing block 326 determines if the leak is at the pump. If the leak is at the pump, illustrated processing block 320 initiates server, heat exchange and pump shutdown sequences. Illustrated processing block 322 generates alerts and ensures shutdown sequence. If the leak is not at the pump, illustrated processing block 330 determines if the leak is at the heat exchanger. If so, processing block 320 executes. Otherwise, if the leak is not at the heat exchanger, illustrated processing block 334 determines that the sensor read failure is suspected and increments the retry counter.

If processing block 310 does not detect a leak, illustrated processing block 316 determines if pressures are within normal range. If processing block 316 determines that the pressures are not within normal ranges, processing block 320 executes. If processing block 316 determines that the pressures are within normal ranges, illustrated processing block 318 determines if temperatures are within normal range. If processing block 318 determines that the temperatures are within normal range, the method 300 ends.

Figure 4:
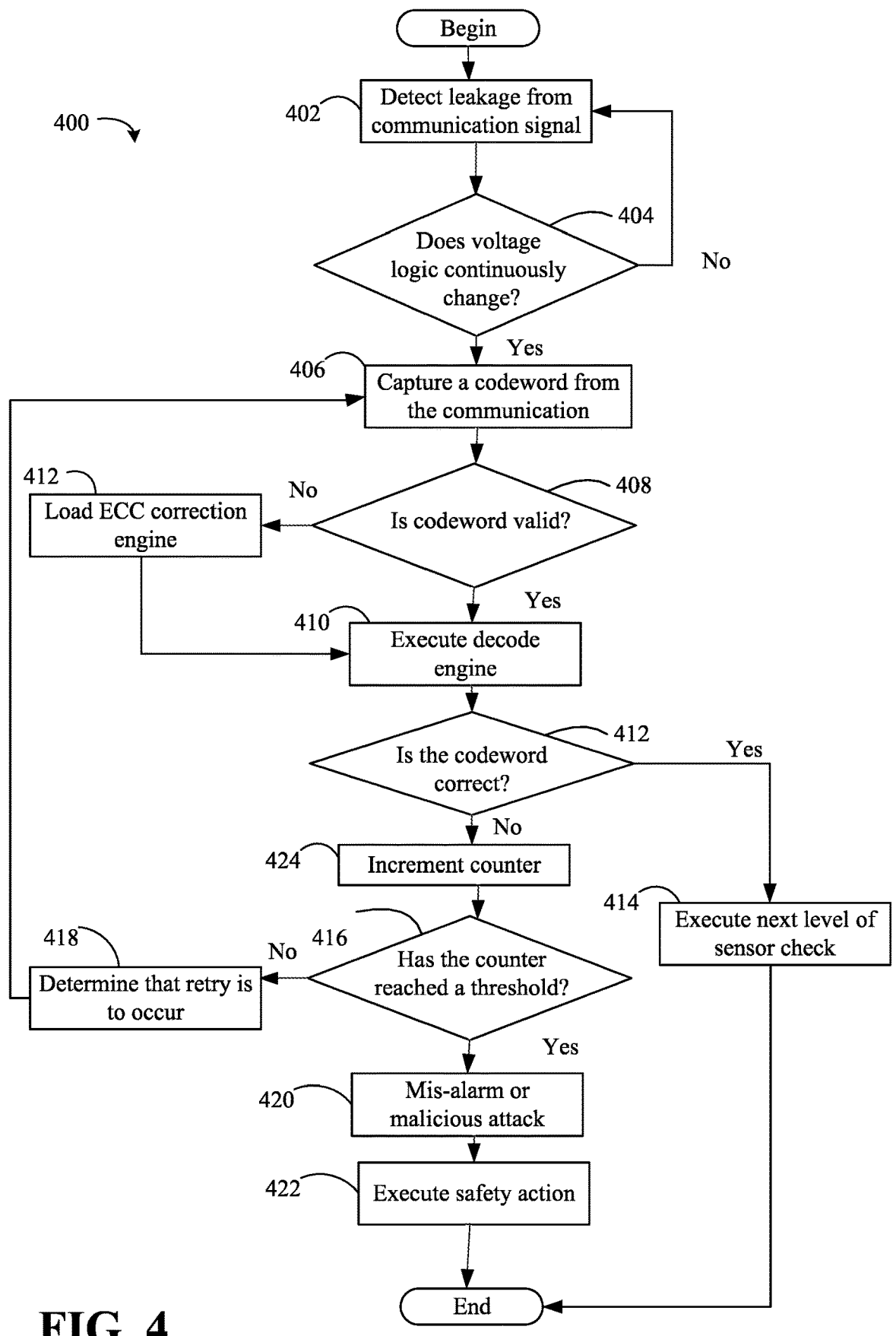
FIG. 4 is a flowchart of an example of a method of determining if a message, relating to fluid sensor data, is authentic in a network system according to an example of the disclosure.

FIG. 4 illustrates a method 400 to determine if a message, relating to fluid sensor data, is authentic in a network system. One or more aspects of method 400 may be implemented as part of and/or in conjunction with the leak detection network architecture 100 (FIG. 1), the security enhanced leak detection network architecture 200 (FIG. 2) and/or method 300 (FIG. 3). Method 400 may be implemented in a computing device, computing system (e.g., hardware, configurable logic, fixed-function logic hardware, at least one computer readable storage medium comprising a set of instructions for execution, etc.). In some examples, the method 400 may be executed by the RPU 114 (FIG. 1) and/or RPU 208 (FIG. 2).

Illustrated processing block 402 detects leakage from a communication signal. Illustrated processing block 404 determines if voltage logic changes continuously. If processing block 404 determines that the voltage logic does not change continuously, processing block 404 executes. If processing block 404 determines that the voltage logic does continuously change, illustrated processing block 406 captures a codeword from the communication.

Illustrated processing block 408 determines if the codeword is valid. If the codeword is not valid, illustrated processing block 412 loads an ECC correction engine. If the codeword is valid, illustrated processing block 410 executes a decode engine. Illustrated processing block 412 determines if the codeword is correct. If not, illustrated processing block 424 increments a counter. Illustrated processing block 416 determines if the counter has reached a threshold (e.g., if the retry limit is reached). If the retry limit is not reached, illustrated processing block 418 determines that a retry is to occur, and processing block 406 executes again to attempt to capture a different codeword (e.g., by applying a moving window to a different portion of the communication).

If processing block 416 determines that the retry limit is reached, illustrated processing block 420 determines that a mis-alarm or malicious attack occurred. Illustrated processing block 422 executes a safety action. If processing block 412 determines that the codeword is correct, illustrated processing block 414 executes a next level of sensor check. For example, processing block 414 may include checking other sensors in the rack, which may contain multiple nodes, as there may be multiple leakage detection sensors in the rack. Thus, processing block 414 checks the other sensors to determine whether there is a single node leakage or multi-node leakage such that multiple nodes got flooded.

FIG. 5 illustrates an example of cyclic code shifting 500. The cyclic code shifting 500 may be included in leak detection network architecture 100 (FIG. 1), the security enhanced leak detection network architecture 200 (FIG. 2), method 300 (FIG. 3) and/or method 400 (FIG. 4).

A codeword 502 is shifted so that the most significant bit (MSB) moves to a 6th bit position. A least significant bit (LSB) moves to the MSB to generate a shifted codeword 504. The shifting may continue as well, such the MSB ("1") of the shifted codeword 504 moves to the 6th bit position and the LSB ("1") shifts to the MSB. Both the codeword 502 and shifted codeword 504 are valid.

FIG. 6 illustrates a method 520 to verify leaks detection signals in a network system. One or more aspects of method 520 may be implemented as part of and/or in conjunction with the leak detection network architecture 100 (FIG. 1), the security enhanced leak detection network architecture 200 (FIG. 2), method 300 (FIG. 3), method 400 (FIG. 4) and/or cyclic code shifting 500 (FIG. 5).

Illustrated processing block 522 identifies a codeword associated with a fluid cooling system and a network system. Illustrated processing block 524 generates a status update with the network system. Illustrated processing block 526 embeds the codeword as a repeating cyclic codeword in a message containing the status update. Illustrated processing block 528 transmits the message from the network system to the fluid cooling system over a data link. Illustrated processing block 530 receives the message at the fluid cooling system. Illustrated processing block 532 determines, with the fluid cooling system, whether interference is inserted into the message based on the repeating cyclic codeword in the message.

To embed the codeword as the repeating cyclic codeword in the message, the method 520 repeatedly applies a circular shift to the codeword to generate shifted codewords, and embeds the shifted codewords into the message. The codeword is a maximum distance separable (MDS) code. The method 520 further applies a moving window to the message to detect if the codeword is accurately provided in the communication, where the window has a size that is equal to a size of the codeword. The method 520 further determines, with the fluid cooling system, whether an instance of the repeating cyclic codeword in the communication is valid, and if the instance of the repeating cyclic codeword is not valid, apply an error correction code process to the instance to correct the instance. The method 520 further, when a first instance of the repeating cyclic codeword is correct, check the status update, where the status update indicates whether a leak of fluid was detected in the fluid cooling system. The method 520 further includes that when a second instance of the repeating cyclic codeword is incorrect, incrementing a counter and determine if the counter has reached a threshold, if the threshold is reached, flagging one or more of a mis-alarm or malicious attack, and if the threshold is not reached, reattempting to capture further instances of the codeword from the message.

System Overview

Figure 7:
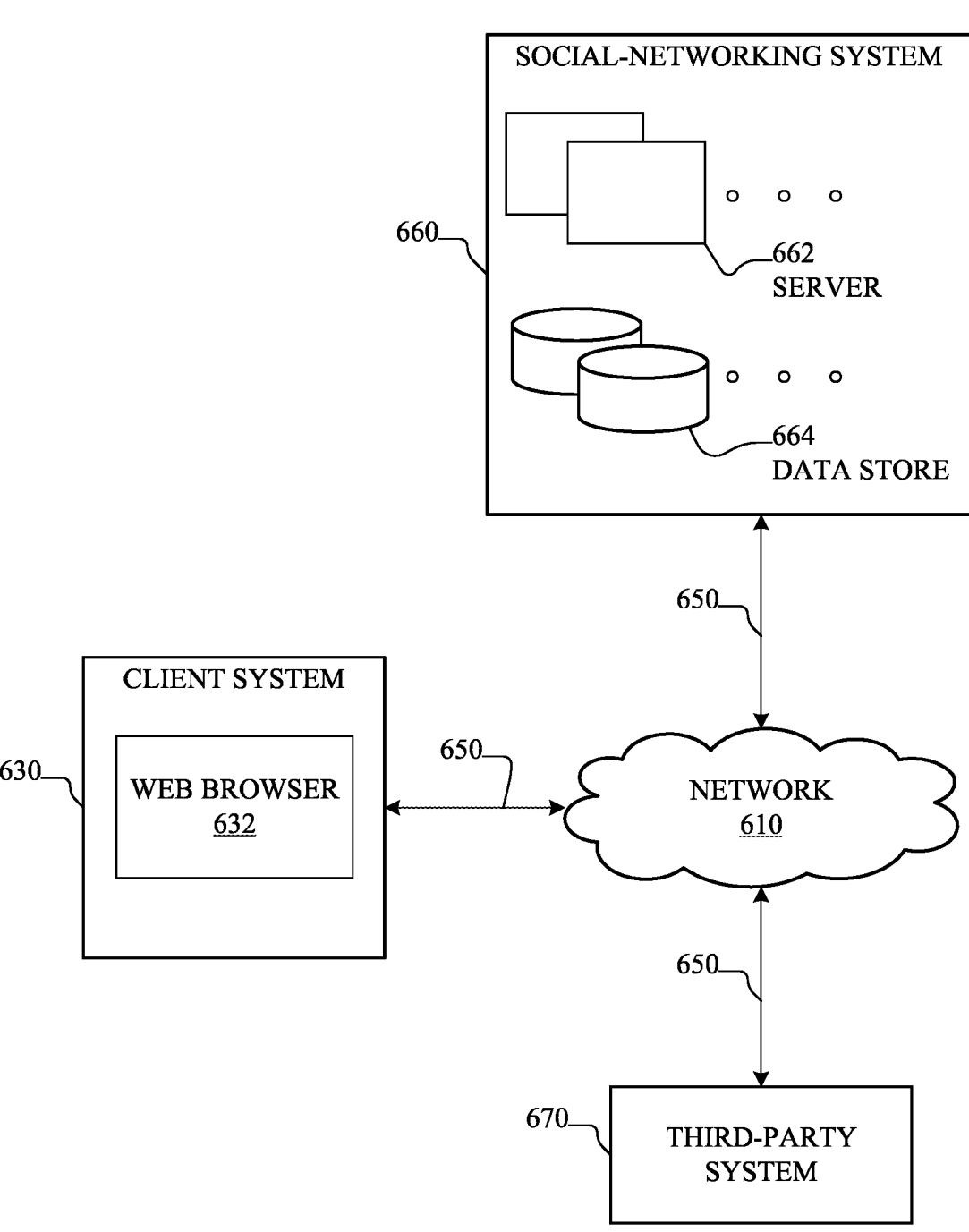
FIG. 7 illustrates an example network environment associated with a social-networking system according to an example of the disclosure.

FIG. 7 illustrates an example network environment 600 associated with a social-networking system. Network environment 600 may implement one or more aspects of the leak detection network architecture 100 (FIG. 1), the security enhanced leak detection network architecture 200 (FIG. 2), method 300 (FIG. 3), method 400 (FIG. 4), cyclic code shifting 500 (FIG. 5) and/or method 520 (FIG. 6) already discussed.

Network environment 600 includes a client system 630, a social-networking system 660, and a third-party system 670 connected to each other by a network 610. Although FIG. 7 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 7 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular examples, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular examples, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 may not necessarily be the same throughout network environment 600. One or more first links 650 may differ in one or more respects from one or more second links 650.

In particular examples, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular examples, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular desires. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular examples, social-networking system 660 may be a network-addressable computing system that can host an online social network. Social-networking system 660 may generate, store, receive, and send social-network-ing data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable appli-cation, or any combination thereof) either directly or via network 610. In particular examples, social-networking sys-tem 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular examples, each server 662 may include hardware, software, or embedded logic components or a combination of two or more such components for carrying out the appropriate functionalities implemented or supported by server 662. In particular examples, social-networking system 660 may include one or more data stores 664. Data stores 664 may be used to store various types of information. In particular examples, the information stored in data stores 664 may be organized according to specific data structures. In particular examples, each data store 664 may be a relational, columnar, correlation, or other suitable database. Although this disclo-sure describes or illustrates particular types of databases, this disclosure contemplates any suitable types of databases. Particular examples may provide interfaces that enable a client system 630, a social-networking system 660, or a third-party system 670 to manage, retrieve, modify, add, or delete, the information stored in data store 664.

In particular examples, social-networking system 660 may store one or more social graphs in one or more data stores 664. In particular examples, a social graph may include multiple nodes-which may include multiple user nodes (each corresponding to a particular user) or multiple concept nodes (each corresponding to a particular con-cept)—and multiple edges connecting the nodes. Social-networking system 660 may provide users of the online social network the ability to communicate and interact with other users. In particular examples, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular examples, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be inter-ested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-net-working system 660 and coupled to social-networking sys-tem 660 via a network 610.

In particular examples, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular examples, a third-party system 670 may include one or more types of servers, one or more data stores, one or more interfaces, including but not limited to APIs, one or more web services, one or more content sources, one or more networks, or any other suitable com-ponents, e.g., that servers may communicate with. A third-party system 670 may be operated by a different entity from an entity operating social-networking system 660. In par-ticular examples, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular examples, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limita-tion, content objects may include incentive content objects, such as coupons, discount tickets, gift certificates, or other suitable incentive objects.

In particular examples, social-networking system 660 also includes user-generated content objects, which may enhance a user's interactions with social-networking system 660. User-generated content may include anything a user can add, upload, send, or "post" to social-networking system 660. As an example and not by way of limitation, a user communi-cates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular examples, social-networking system 660 may include a variety of servers, sub-systems, programs, modules, logs, and data stores. In particular examples, social-networking system 660 may include or a combination of the following: a web server, action logger, API-request server, relevance-and-ranking engine, content-object classi-fier, notification controller, action log, third-party-contentobject-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular examples, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 8:
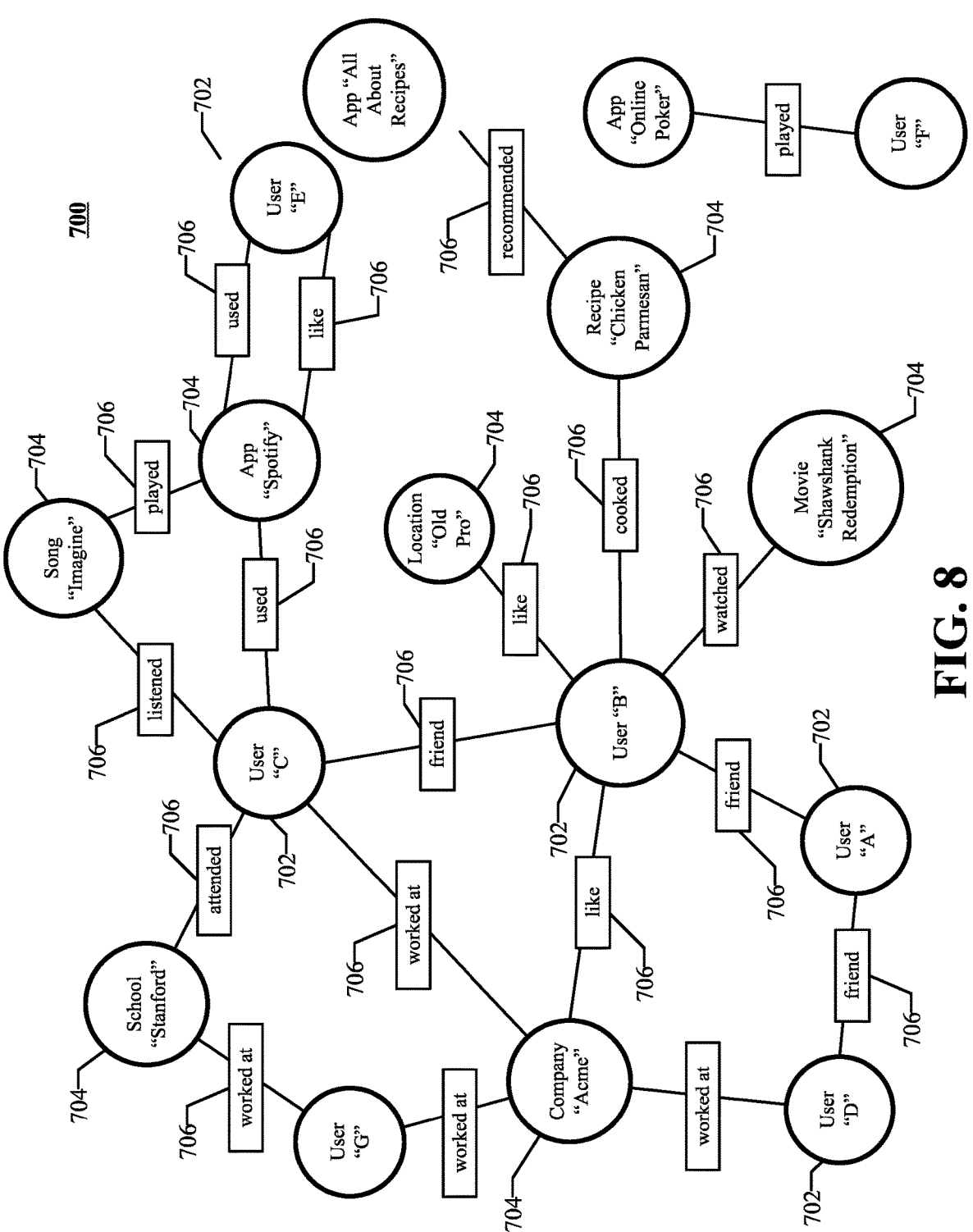
FIG. 8 illustrates an example social graph according to an example of the disclosure.

FIG. 8 illustrates example social graph 700. In some examples, leak detection network architecture 100 (FIG. 1), the security enhanced leak detection network architecture 200 (FIG. 2), method 300 (FIG. 3), method 400 (FIG. 4), cyclic code shifting 500 (FIG. 5) and/or method 520 (FIG. 6) already discussed may access social graph 700 to implement one or more aspects.

In particular examples, social-networking system 660 may store one or more social graphs 700 in one or more data stores. In particular examples, social graph 700 may include multiple nodes-which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 8 is shown, for didactic purposes, in a two-dimensional visual map representation. In particular examples, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular examples, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular examples, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular examples, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular examples, a user node 702 may be associated with one or more data objects corresponding to information associated with a user. In particular examples, a user node 702 may correspond to one or more webpages.

In particular examples, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in an augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular examples, a concept node 704 may be associated with one or more data objects corresponding to information associated with concept node 704. In particular examples, a concept node 704 may correspond to one or more webpages.

In particular examples, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular examples, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "cat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular examples, a pair of nodes in social graph 700 may be connected to each other by one or more edges 706. An edge 706 connecting a pair of nodes may represent a relationship between the pair of nodes. In particular examples, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or a combination of data stores 664. In the example of FIG. 8, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular examples, an edge 706 between a user node 702 and a concept node 704 may represent a particular action or activity performed by a user associated with user node 702 toward a concept associated with a concept node 704. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 8) between user nodes 702 corresponding to the user and concept nodes 704 corresponding to the song and application to indicate that the user listened to the song and used the application. Moreover, social-networking system 660 may create a "played" edge 706 (as illustrated in FIG. 8) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 8 between user node 702 for user "E" and concept node 704 for "SPOTIFY").

In particular examples, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular examples, social-networking system 660 may store an edge 706 in one or more data stores. In particular examples, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular examples, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular examples, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular examples, social-networking system 660 may use a variety of factors to calculate a coefficient. These factors may include, for example, user actions, types of relationships between objects, location information, other suitable factors, or any combination thereof. In particular examples, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular examples, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular examples, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular examples, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular examples, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or a combination of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular examples, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular examples, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular examples, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular examples, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular examples, social-networking system 660 may calculate a coefficient based on location information. Objects that are geographically closer to each other may be considered to be more related or of more interest to each other than more distant objects. In particular examples, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular examples, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular examples, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular examples, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular examples, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular examples, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular examples may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular examples, one or a combination of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular examples, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular examples, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular examples, privacy settings may allow users to opt in or opt out of having their actions logged by social-networking system 660 or shared with other systems (e.g., third-party system 670). In particular examples, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular examples, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object has a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
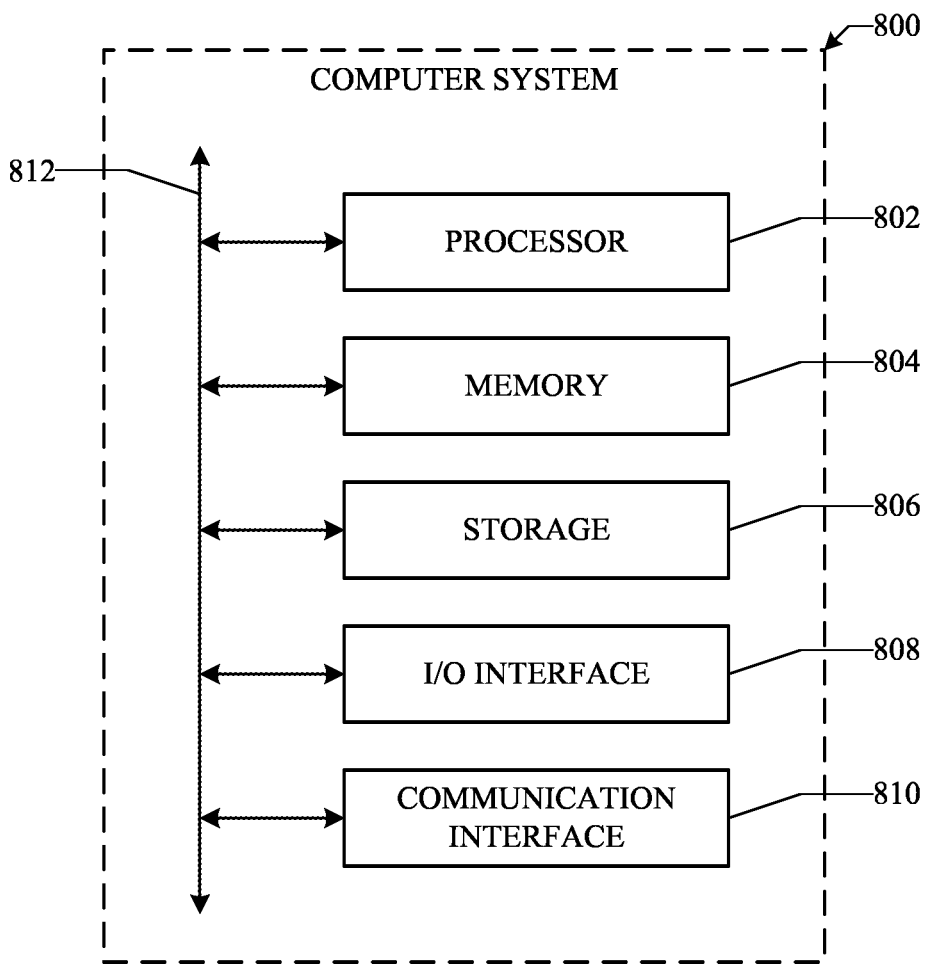
FIG. 9 illustrates an example computer system according to an example of the disclosure.

FIG. 9 illustrates an example computer system 800. The system 800 may implement one or more aspects of leak detection network architecture 100 (FIG. 1), the security enhanced leak detection network architecture 200 (FIG. 2), method 300 (FIG. 3), method 400 (FIG. 4), cyclic code shifting 500 (FIG. 5) and/or method 520 (FIG. 6) already discussed. In particular examples, one or more computer systems 800 perform one or more steps of one or more methods described or illustrated herein. In particular examples, one or more computer systems 800 provide functionality described or illustrated herein. In particular examples, software running on one or more computer systems 800 performs one or more steps of one or more methods described or illustrated herein or provides functionality described or illustrated herein. Particular examples include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular examples, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular examples, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular examples, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular examples, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular examples, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or a combination of those results to memory 804. In particular examples, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular examples, one or more memory management units (MMUs) reside between processor 802 and memory 804 and facilitate accesses to memory 804 requested by processor 802. In particular examples, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular examples, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular examples, storage 806 is non-volatile, solid-state memory. In particular examples, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular examples, I/O interface 808 includes hardware, software, or both, providing one or more interfaces for communication between computer system 800 and one or more I/O devices. Computer system 800 may include one or a combination of these I/O devices, where appropriate. One or a combination of of these I/O devices may enable communication between a person and computer system 800.

As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or a combination of these I/O devices. I/O interface 808 may include one or more I/O interfaces 808, where appropriate. Although this disclosure describes and illustrates a particular I/O interface, this disclosure contemplates any suitable I/O interface.

In particular examples, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or a combination of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular examples, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

EXAMPLES

Example 1 includes at least one computer readable storage medium comprising a set of instructions, which when executed by a computing device, causes the computing device to identify a codeword associated with a fluid cooling system and a network system, generate a status update with the network system, embed the codeword as a repeating cyclic codeword in a message containing the status update, transmit the message from the network system to the fluid cooling system over a data link, receive the message at the fluid cooling system, and determine, with the fluid cooling system, whether interference is inserted into the message based on the repeating cyclic codeword in the message.

Example 2 includes the at least one computer readable storage medium of Example 1, where to embed the codeword as the repeating cyclic codeword in the message, the instructions when executed by the computing device, cause the computing device to repeatedly apply a circular shift to the codeword to generate shifted codewords, and embed the shifted codewords into the message.

Example 3 includes the at least one computer readable storage medium of any one of Examples 1 to 2, where the codeword is a maximum distance separable (MDS) code.

Example 4 includes the at least one computer readable storage medium of any one of Examples 1 to 3, where the instructions, when executed, cause the computing device to apply a moving window to the message to detect if the codeword is accurately provided in the message, where the window has a size that is equal to a size of the codeword.

Example 5 includes the at least one computer readable storage medium of any one of Examples 1 to 4, where the set of instructions, which when executed by the computing device determine, with the fluid cooling system, whether an instance of the repeating cyclic codeword in the message is valid, and if the instance of the repeating cyclic codeword is not valid, apply an error correction code process to the instance.

Example 6 includes the at least one computer readable storage medium of any one of Examples 1 to 5, where the set of instructions, which when executed by the computing device when a first instance of the repeating cyclic codeword is correct, check the status update, where the status update indicates whether a leak of fluid was detected in the fluid cooling system.

Example 7 includes the at least one computer readable storage medium of Example 6, where the set of instructions, which when executed by the computing device when a second instance of the repeating cyclic codeword is incorrect, increment a counter and determine if the counter has reached a threshold, if the threshold is reached, flag one or more of a mis-alarm or malicious attack, and if the threshold is not reached, reattempt to capture further instances of the repeating cyclic codeword from the message.

Example 8 includes a system comprising one or more processors, and a memory coupled to the one or more processors, the memory comprising instructions executable by the one or more processors, the one or more processors being operable when executing the instructions to identify a codeword associated with a fluid cooling system and a network system, generate a status update with the network system, embed the codeword as a repeating cyclic codeword in a message containing the status update, transmit the message from the network system to the fluid cooling system over a data link, receive the message at the fluid cooling system, and determine, with the fluid cooling system, whether interference is inserted into the message based on the repeating cyclic codeword in the message.

Example 9 includes the system of Example 8, where to embed the codeword as the repeating cyclic codeword in the message, the one or more processors are further operable when executing the instructions to repeatedly apply a circular shift to the codeword to generate shifted codewords, and embed the shifted codewords into the message.

Example 10 includes the system of any one of Examples 8 to 9, where the codeword is a maximum distance separable (MDS) code.

Example 11 includes the system of any one of Examples 8 to 10, where the one or more processors are further operable when executing the instructions to apply a moving window to the message to detect if the codeword is accurately provided in the message, where the window has a size that is equal to a size of the codeword.

Example 12 includes the system of any one of Examples 8 to 11, where the one or more processors are further operable when executing the instructions to determine, with the fluid cooling system, whether an instance of the repeating cyclic codeword in the message is valid, and if the instance of the repeating cyclic codeword is not valid, apply an error correction code process to the instance.

Example 13 includes the system of any one of Examples 8 to 12, where the one or more processors are further operable when executing the instructions to when a first instance of the repeating cyclic codeword is correct, check the status update, where the status update indicates whether a leak of fluid was detected in the fluid cooling system.

Example 14 includes the system of Example 13, where the one or more processors are further operable when executing the instructions to when a second instance of the repeating cyclic codeword is incorrect, increment a counter and determine if the counter has reached a threshold, if the threshold is reached, flag one or more of a mis-alarm or malicious attack, and if the threshold is not reached, reattempt to capture further instances of the repeating cyclic codeword from the message.

Example 15 includes a method comprising identifying a codeword associated with a fluid cooling system and a network system, generating a status update with the network system, embedding the codeword as a repeating cyclic codeword in a message containing the status update, transmitting the message from the network system to the fluid cooling system over a data link, receiving the message at the fluid cooling system, and determining, with the fluid cooling system, whether interference is inserted into the message based on the repeating cyclic codeword in the message.

Example 16 includes the method of Example 15, where the embedding comprises repeatedly applying a circular shift to the codeword to generate shifted codewords, and embedding the shifted codewords into the message.

Example 17 includes the method of any one of Examples 15 to 16, where the codeword is a maximum distance separable (MDS) code.

Example 18 includes the method of any one of Examples 15 to 17, further comprising applying a moving window to the message to detect if the codeword is accurately provided in the message, where the window has a size that is equal to a size of the codeword.

Example 19 includes the method of any one of Examples 15 to 18, further comprising determining, with the fluid cooling system, whether an instance of the repeating cyclic codeword in the message is valid, and if the instance of the repeating cyclic codeword is not valid, applying an error correction code process to the instance.

Example 20 includes the method of any one of Examples 15 to 19, further comprising when a first instance of the repeating cyclic codeword is correct, checking the status update, where the status update indicates whether a leak of fluid was detected in the fluid cooling system, when a second instance of the repeating cyclic codeword is incorrect, incrementing a counter and determine if the counter has reached a threshold, if the threshold is reached, flagging one or more of a mis-alarm or malicious attack, and if the threshold is not reached, reattempting to capture further instances of the repeating cyclic codeword from the message.

Example 21 includes an apparatus comprising means for identifying a codeword associated with a fluid cooling system and a network system, means for generating a status update with the network system, means for embedding the codeword as a repeating cyclic codeword in a message containing the status update, means for transmitting the message from the network system to the fluid cooling system over a data link, means for receiving the message at the fluid cooling system, and means for determining, with the fluid cooling system, whether interference is inserted into the message based on the repeating cyclic codeword in the message.

Example 22 includes the apparatus of Example 21 apparatus, where the means for embedding comprises means for repeatedly applying a circular shift to the codeword to generate shifted codewords, and means for embedding the shifted codewords into the message.

Example 23 includes the apparatus of any one of Examples 21 to 22, where the codeword is a maximum distance separable (MDS) code.

Example 24 includes the apparatus of any one of Examples 21 to 23, further comprising means for applying a moving window to the message to detect if the codeword is accurately provided in the message, where the window has a size that is equal to a size of the codeword.

Example 25 includes the apparatus of any one of Examples 21 to 24, further comprising means for determining, with the fluid cooling system, whether an instance of the repeating cyclic codeword in the message is valid, and if the instance of the means for repeating cyclic codeword is not valid, applying an error correction code process to the instance.

Example 26 includes the apparatus of any one of Examples 21 to 25, further comprising when a first instance of the repeating cyclic codeword is correct, means for check the status update, where the status update indicates whether a leak of fluid was detected in the fluid cooling system, when a second instance of the repeating cyclic codeword is incorrect, means for incrementing a counter and determine if the counter has reached a threshold, if the threshold is reached, means for flagging one or more of a mis-alarm or malicious attack, and if the threshold is not reached, means for reattempting to capture further instances of the repeating cyclic codeword from the message.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary examples to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although examples are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the examples. Further, arrangements may be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. At least one non-transitory computer readable storage medium comprising a set of instructions, which when executed by a computing device, causes the computing device to:

identify a codeword associated with a fluid cooling system and a network system;

generate a status update with the network system;

embed the codeword as a repeating cyclic codeword in a message containing the status update;

transmit the message from the network system to the fluid cooling system over a data link;

receive the message at the fluid cooling system;

determine, with the fluid cooling system, whether interference is inserted into the message based on the repeating cyclic codeword in the message;

determine that a first instance of the repeating cyclic codeword is incorrect;

increment a counter;

determine if the counter has reached a threshold; and responsive to determining that the threshold is satisfied, flag one or more of a mis-alarm or malicious attack, or responsive to determining that the threshold is not satisfied, reattempt to capture further instances of the repeating cyclic codeword from the message.

2. The at least one non-transitory computer readable storage medium of claim 1, wherein to embed the codeword as the repeating cyclic codeword in the message, the instructions when executed by the computing device, cause the computing device to:

repeatedly apply a circular shift to the codeword to generate shifted codewords; and embed the shifted codewords into the message.

3. The at least one non-transitory computer readable storage medium of claim 1, wherein the codeword is a maximum distance separable (MDS) code.

4. The at least one non-transitory computer readable storage medium of claim 1, wherein the instructions, when executed, cause the computing device to:

apply a moving window to the message to detect if the codeword is accurately provided in the message, wherein the window has a size that is equal to a size of the codeword.

5. The at least one non-transitory computer readable storage medium of claim 1, wherein the set of instructions, which when executed by the computing device:

determine, with the fluid cooling system, whether an instance of the repeating cyclic codeword in the message is valid; and if the instance of the repeating cyclic codeword Is not valid, apply an error correction code process to the instance.

6. The at least one non-transitory computer readable storage medium of claim 1, wherein the set of instructions, which when executed by the computing device:

when a second instance of the repeating cyclic codeword is correct, check the status update, wherein the status update indicates whether a leak of fluid was detected in the fluid cooling system.

7. A system comprising:

one or more processors; and memory coupled to the one or more processors, the memory comprising computer-executable instructions executable by the one or more processors, the one or more processors configured to execute the computer-executable instructions to:

identify a codeword associated with a fluid cooling system and a network system;

generate a status update with the network system;

embed the codeword as a repeating cyclic codeword in a message containing the status update;

transmit the message from the network system to the fluid cooling system over a data link;

receive the message at the fluid cooling system;

determine, with the fluid cooling system, whether interference is inserted into the message based on the repeating cyclic codeword in the message;

determine that a first instance of the repeating cyclic codeword is incorrect;

increment a counter;

determine if the counter has reached a threshold; and responsive to determining that the threshold is satisfied, flag one or more of a mis-alarm or malicious attack, or responsive to determining that the threshold is not satisfied, reattempt to capture further instances of the repeating cyclic codeword from the message.

8. The system of claim 7, wherein to embed the codeword as the repeating cyclic codeword in the message, the one or more processors are further operable to:

repeatedly apply a circular shift to the codeword to generate shifted codewords; and embed the shifted codewords into the message.

9. The system of claim 7, wherein the codeword is a maximum distance separable (MDS) code.

10. The system of claim 7, wherein the one or more processors are further operable to:

apply a moving window to the message to detect if the codeword is accurately provided in the message, wherein the window has a size that is equal to a size of the codeword.

11. The system of claim 7, wherein the one or more processors are further operable to:

determine, with the fluid cooling system, whether an instance of the repeating cyclic codeword in the message is valid; and if the instance of the repeating cyclic codeword Is not valid, apply an error correction code process to the instance.

12. The system of claim 7, wherein the one or more processors are further operable to:

when a second instance of the repeating cyclic codeword is correct, check the status update, wherein the status update indicates whether a leak of fluid was detected in the fluid cooling system.

13. A method comprising:

identifying, by one or more computer processors coupled to memory, a codeword associated with a fluid cooling system and a network system;

generating a status update with the network system;

embedding the codeword as a repeating cyclic codeword in a message containing the status update;

transmitting the message from the network system to the fluid cooling system over a data link;

receiving the message at the fluid cooling system;

determining, with the fluid cooling system, whether interference is inserted into the message based on the repeating cyclic codeword in the message;

determining that a first instance of the repeating cyclic codeword is incorrect;

incrementing a counter;

determining if the counter has reached a threshold; and responsive to determining that the threshold is satisfied, flagging one or more of a mis-alarm or malicious attack, or responsive to determining that the threshold is not satisfied, reattempting to capture further instances of the repeating cyclic codeword from the message.

14. The method of claim 13, wherein the embedding comprises:

repeatedly applying a circular shift to the codeword to generate shifted codewords; and embedding the shifted codewords into the message.

15. The method of claim 13, wherein the codeword is a maximum distance separable (MDS) code.

16. The method of claim 13, further comprising:

applying a moving window to the message to detect if the codeword is accurately provided in the message, wherein the window has a size that is equal to a size of the codeword.

17. The method of claim 13, further comprising:

determining, with the fluid cooling system, whether an instance of the repeating cyclic codeword in the message is valid; and if the instance of the repeating cyclic codeword is not valid, applying an error correction code process to the instance.

18. The method of claim 13, further comprising:

when a second instance of the repeating cyclic codeword is correct, checking the status update, wherein the status update indicates whether a leak of fluid was detected in the fluid cooling system.

* * * * *